United States Patent [19]
Smith

[11] 3,919,136
[45] Nov. 11, 1975

[54] ROOM TEMPERATURE VULCANIZABLE SILICONE RUBBER COMPOSITION

[75] Inventor: Robert A. Smith, Schenectady, N.Y.

[73] Assignee: General Electric Company, Waterford, N.Y.

[22] Filed: May 23, 1974

[21] Appl. No.: 473,076

[52] U.S. Cl. .............. 260/9; 260/18 S; 260/37 SB; 260/45.75 T; 260/45.75 H; 260/45.75 K; 260/46.5 G
[51] Int. Cl.² .......................................... C08L 1/02
[58] Field of Search ......... 260/18 S, 46.5 G, 37 SB, 260/825, 45.75 T, 45.75 H, 45.75 K, 9, 824

[56] References Cited
UNITED STATES PATENTS

| | | | |
|---|---|---|---|
| 3,839,246 | 10/1974 | Hamilton et al. | 260/18 S |
| 3,845,161 | 10/1974 | Beers | 260/825 |

*Primary Examiner*—Melvyn I. Marquis
*Attorney, Agent, or Firm*—Donald J. Voss, Esq.; E. Philip Koltos, Esq.; Frank L. Neuhauser, Esq.

[57] ABSTRACT

A room temperature vulcanizable silicone rubber composition having thermal stability, low shrinkage upon cure and a long work life containing a linear fluid organopolysiloxane containing terminal silicon bonded hydroxy groups and having a viscosity of anywhere from 1000 to 10,000,000 centipoise at 25°C; from 100 to 350% by weight based on said linear organopolysiloxane of an extending filler; from 1 to 30% by weight of said linear organopolysiloxane of a cross linking agent which is preferably an alkyl silicate or a partial hydrolysis product of an alkyl silicate; from 0.5 to 10% by weight of a worklife extending additive which is a low molecular weight silanol end-stopped diorganopolysiloxane and from 0.1 to 5% by weight of said linear organopolysiloxane of a catalyst which is the reaction product of an organic tin oxide and a hydrocarbon ester. The above-named ingredients cure to a silicone elastomer which is especially suited for making molds.

17 Claims, No Drawings

ROOM TEMPERATURE VULCANIZABLE SILICONE RUBBER COMPOSITION

BACKGROUND OF THE INVENTION

The present invention relates to room temperature vulcanizable silicone rubber compositions and more particularly to room temperature vulcanizable silicone rubber compositions which have a long worklife and are thermally and chemically stable.

As is well known to a worker skilled in the art, room temperature vulcanizable silicone rubber compositions, both the one-component and two-component types, are suitable for making molds from masters wherein the mold can be utilized in molding products made of polystyrene, polyvinyl, chloride and polyethylene as well as other materials. It should be noted that most one-component room temperature vulcanizable silicone rubber compositions when put to the foregoing use of making molds did not perform satisfactorily for various reasons such as, for instance, a short worklife, a short pot life and slow curing in thick cross sections. Such short worklife and short pour times of one-component room temperature vulcanizable silicone rubber compositions is a result of the fact that such one-component systems cure immediately upon being exposed to atmospheric moisture.

Another difficulty with such one-component room temperature vulcanizable silicone rubber compositions was that they had to be kept in the anhydrous state completely since the exposure of such a composition to moisture for any period of time immediately started the vulcanization processes working. Accordingly, the one-component room temperature vulcanizable silicone rubber composition system would immediately start to cure necessitating special handling procedures when such were used to form molds.

Accordingly, many workers skilled in the art have utilized two-component room temperature vulcanizable silicone rubber compositions rather than a one-component system for the production of molds. This desirability for utilizing a two-component room temperature vulcanizable silicone rubber composition was the fact that they had a longer shelf life and was easier to work with in making molds than the one-component room temperature vulcanizable silicone rubber composition.

An early description of such two-component room temperature vulcanizable silicone rubber compositions is to be found in Berridge, U.S. Pat. No. 2,843,555. However, even with the standard two-part room temperature vulcanizable silicone rubber compositions some difficulties were incurred. For instance, the compositions would not have the desired chemical resistance in the final silicone elastomer to various chemically active agents. In addition, such compositions did not have the desired work life and pot time that was needed in certain molding operations.

Another disadvantage with such two-component room temperature vulcanizable silicone rubber compositions was that upon cure they tended to shrink measurably, which shrinkage was undesired in the preparation of molds.

A more important deficiency of such two-component room temperature vulcanizable silicone rubber compositions was they tended not to be thermally stable at elevated temperatures such as, 300°F and above. Such thermal stability was needed if polyvinyl chloride, polystyrene and polyethylene parts were to be formed in molds prepared from such compositions.

Accordingly, it was highly desirable to have a two-part room temperature vulcanizable silicone rubber composition which in the cured state is thermally stable to temperatures of 300°F and above.

It was also desirable that such two-component room temperature vulcanizable silicone rubber compositions which were to be utilized to form molds have present some free water in the composition without bringing about any vulcanization of the silicone elastomer composition. Such tolerance of water in small amounts by two-part room temperature vulcanizable silicone rubber compositions which were to be used to make molds eliminated the disadvantages inherent in the one-component room temperature vulcanizable silicone rubber compositions. Accordingly, it was found that by the use of certain specific additives in certain concentrations that there could be obtained a two-component room temperature vulcanizable silicone rubber composition which is thermally stable at 300°F or above and that can tolerate water in small amounts and is also chemically resistant to various corrosive agents. In addition, if desired, the composition can have a low shrinkage upon curing, as compared to standard two-part room temperature vulcanizable silicone rubber compositions.

Accordingly, it is one object of the present invention to provide a room temperature vulcanizable silicone rubber composition which is thermally stable.

It is another object of the present invention to provide a room temperature vulcanizable silicone rubber composition that is chemically resistant.

It is an additional object of the present invention to provide a room temperature vulcanizable silicone rubber composition which can have low shrinkage upon curing.

It is an additional object of the present invention to provide for a room temperature vulcanizable silicone rubber composition that had a long work life and long pot time.

It is still another object of the present invention to provide for a room temperature vulcanizable silicone rubber composition which is eminently suitable and advantageous for producing elastomeric molds in which polyvinyl chloride, polyester and polyethylene parts can be formed.

SUMMARY OF THE INVENTION

There is provided by the present invention and in accordance with the above objects, a room temperature vulcanizable silicone rubber composition having thermal stability, low shrinkage upon cure, if desired, and a long work life comprising a linear fluid organopolysiloxane containing terminal silicon bonded hydroxy groups and having a viscosity of 1000 to 10,000,000 centipoise at 25°C, the groups of the afore-mentioned organopolysiloxane representing monovalent hydrocarbon radicals.

The second necessary ingredient in order to impart chemical resistance to the cured silicone elastomer is the addition of from 100 to 350% by weight of said linear organopolysiloxane of an extending filler. There is also present in the composition from 1 to 30% by weight of an alkyl silicate selected from the class consisting of a monomeric silicate corresponding to the general formula, (1) $(R'O)_3 SiR''$ where R' is a radical selected from the class consisting of monovalent hydrocarbon radicals and halogenated monovalent hydrocarbon radicals and R'' is selected from the class consisting of alkyl, haloalkyl, aryl, haloaryl, alkenyl, cycloalkyl, alkoxy and aryloxy radicals, and a liquid partial hydrolysis product of the aforementioned organosilicate monomeric compound. There must be present in the composition along with the other ingredients from 0.5 to 10% by weight based on said linear organopolysiloxane of a work-life extending additive of the formula,

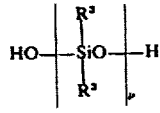   (2)

where $R^3$ is a radical selected from the class consisting of monovalent hydrocarbon radicals, halogenated monovalent hydrocarbon radicals and cyanoalkyl radicals, and in the same formula where p varies from 2 to 46. Finally, there is present from 0.1 to 5% by weight based on said linear organopolysiloxane of a catalyst which is the reaction product of an organic tin oxide having the formula, (3) $R^4 R^5 Sno$ where $R^4$ and $R^5$ are monovalent hydrocarbon radicals with a hydrocarbon ester selected from the class consisting of esters of monocarboxylic acid, esters of dicarboxylic acids, and esters of inorganic acids, containing at least one oxygen atom in the compound attached to a replaceable hydrogen atom, and where such catalyst is formed by reacting 6 to 1 moles of the organic tin oxide per mole of the ester and the reaction is carried out at a temperature in the range of anywhere from room temperature to 250°C.

The type of filler in the composition of the present case as well as the amount of filler in the composition of the present case is very important. That is, there must be used large amounts of filler to give the final cured elastomer sufficient strength and chemical resistance and such filler has to be an extending filler rather than a reinforcing filler which would shorten the work life of the composition prior to cure.

Examples of extending fillers which may be utilized in the composition of the present invention may be any extending filler, but it is preferred that such extending filler be selected from extending fillers such as, titanium dioxide, lithopone, zinc oxides or chromium silicate, crushed quartz, silica aerogel, iron oxide, diatomaceous earth, calcium carbonate, glass fibers, magnesium oxide, zirconium oxide, aluminum oxide, calcined clay, asbestos, carbon, graphite, cotton fibers, and synthetic fibers.

It should be noted that if a reinforcing filler such as, fumed silica, precipitated silica are utilized in the composition of the present case as a replacement for the extending filler or in addition to the extending filler in the composition, it will not have the long work life and long pot time that is present in the composition of the present case.

Optionally, it is also desirable in the present composition that there be anywhere from 90 to 3000 parts per million of free water in the composition so as to obtain deep section cure in the compositions of the present case, which deep section cure is highly desirable in the making of silicone elastomer molds. For dispersion purposes of the catalyst there may also be present at a concentration of 20 to 100% by weight of said linear organopolysiloxane of a silicone dispersing agent of the formula,

   (4)

where t in the foregoing formula is a whole number that varies from 2 to 700 and $R^6$ is a radical selected from the class consisting of alkyl radicals, halogenated alkyl radicals, aryl radicals, and halogenated alkyl radicals of up to 8 carbon atoms.

It should be noted that the critical ingredients in the two-component room temperature vulcanizable silicone rubber composition of the present case is the solubilized tin oxide catalyst at the specified concentration and the presence in the designated concentration of the low molecular weight silanol-terminated diorganopolysiloxane.

In addition, if it is desired to have a composition that has a low shrinkage upon curing of 1% or less, it is very important and critical in the present invention that there be used in place of the monomeric alkyl silicate, the partial hydrolysis product of such monomeric silicate at a concentration of preferably anywhere from 1.0 to 20% by weight based on the weight of the linear organopolysiloxane silanol end-stopped polymer.

The advantages of the two-component room temperature vulcanizable silicone rubber composition is present only when extending filler at the concentrations shown is used combined with the organic tin oxide reaction product catalyst, and the low molecular weight silanol-stopped diorganopolysiloxanes of Formula (2) above.

DESCRIPTION OF THE PREFERRED EMBODIMENT

A basic ingredient in the room temperature vulcanizable silicone rubber composition of the present invention is the linear fluid organopolysiloxane containing terminal silicon bonded hydroxy groups and having a viscosity of anywhere from 1000 to 10,000,000 centipoise at 25°C, wherein the organic groups of the aforementioned organopolysiloxane represent monovalent hydrocarbon radicals and halogenated monovalent hydrocarbon radicals. The linear organopolysiloxane preferably has the formula,

   (5)

where $R^7$ is selected from the class consisting of monovalent hydrocarbon radicals, halogenated monovalent hydrocarbon radicals, and cyanoalkyl radicals and n is a whole number that varies from 300 to 5,260. More preferably, the $R^7$ radical is selected from alkyl radicals such as, methyl, ethyl, propyl; cycloalkyl radicals such as, cyclohexyl, cycloheptyl; alkenyl radicals such as, vinyl, allyl; mononuclear aryl radicals such as, phenyl; aralkyl radicals such as, phenylethyl, etc.; alkaryl radicals such as, phenylethyl, phenylpropyl, etc.; and other monovalent hydrocarbon radicals which normally constitute substituent groups on silicon atoms and silicone polymers. More preferably, the $R^7$ radical is selected from alkyl radicals of 1 to 8 carbon atoms; cycloalkyl radicals of 4 to 8 carbon atoms; vinyl and phenyl radicals, and mixtures of such radicals.

Such silanol-stopped linear diorganopolysiloxanes of the formula above, are normally prepared by first hydrolyzing diorganodichlorosilanes. The hydrolyzate is then taken and the water separated from it. The resulting hydrolyzate which is a mixture of low molecular weight silanol-stopped diorganopolysiloxanes and cyclic polysiloxanes is taken and there is added to it a catalytic amount of a basic catalyst such as, potassium hydroxide or sodium hydroxide and the resulting mixture is heated at elevated temperatures of 150 to 200°C so as to strip overhead a mixture of cyclic trisiloxanes, cyclic tetrasiloxanes and cyclic pentasiloxanes. The cyclic tetrasiloxanes are preferably separated from the other cyclic siloxanes in the stripping procedure. The cyclic tetrasiloxanes are then taken in substantially pure form wherein the $R^7$ groups may be the same or may be a mixture of such groups as has been set forth above and mixed with other cyclic tetrasiloxanes in required proportions. to get the proper substitution of the $R^7$ radicals that is desired in the final polymer. To such mixtures of cyclic tetrasiloxanes there is added catalytic amounts of a strong base catalyst such as, potassium hydroxide or sodium hydroxide, wherein the concentration of the base catalyst varies anywhere from 10 parts per million to 100 parts per million based on the concentration of the cyclic tetrasiloxane.

The resulting mixture containing cyclic tetrasiloxanes and potassium or sodium hydroxide is then heated at elevated temperatures of 150 to 200°C until there is obtained a high molecular weight diorganopolysiloxane gum having a viscosity of anywhere from 1000,000 centipoise to 200,000,000 centipoise viscosity at 25°C. This final gum which is formed in the above reaction is formed in an equilibration procedure in which at the maximum equilibration point 85% by weight of the cyclic tetrasiloxanes have been converted to a diorganopolysiloxane gum and at which point in the equilibration as much of the diorganopolysiloxane gum is broken up to form cyclic tetrasiloxanes as there are cyclic tetrasiloxanes being converted to the diorganopolysiloxane gum. At this point the reaction is stopped by lowering the temperature. This gum is then taken and there can be passed steam into it to form the desired silanol-stopped diorganopolysiloxanes of the formula given above.

In an alternative procedure, the diorganopolysiloxane gum may be taken and there may be added the desired amount of water to the gum and the resulting mixture of the diorganopolysiloxane gum and water are equilibrated at elevated temperatures to give the desired viscosity silanolstopped diorganopolysiloxanes of the formula given above. The product is neutralized with a mild acid such as, phosphoric acid, and the cyclic siloxanes, that is, 15% by weight of the cyclic siloxanes, which remain are stripped off to yield the pure silanol-stopped diorganopolysiloxane.

Another process for forming such a silanol-stopped diorganopolysiloxane of the formula above is by the method set forth in Bruce Ashby's patent application entitled "Process for the Production of Silanol-Stopped Diorganopolysiloxanes", Docket 8SI-1563, , Ser. No. 452,940 filed Mar. 18, 1974. Such methods involve the equilibration of the hydrolyzate obtained by hydrolyzing diorganodichlorosilanes and then equilibrating such a hydrolyzate with or without the addition of cyclic polysiloxanes in the presence of an acid-activated solid catalyst such as, sulfuric acid-activated montomorillonite clay.

Another procedure which is also discussed in the above patent application, whose disclosure is hereby incorporated into the present case by reference, is the equilibration of cyclic siloxanes in essentially pure form with water in the presence again of an acid-activated solid catalyst. Irrespective of which procedure is utilized, the silanol-stopped diorganopolysiloxane of the formula above is one of the basic constituents in the composition of the present case. Such a silanol-stopped diorganopolysiloxane may be composed of a single type of silanol-stopped diorganopolysiloxane or may be a blend of two, three or four or more of silanol-stopped diorganopolysiloxanes coming within the scope of the formula given above. The silanol-stopped diorganopolysiloxanes may have a viscosity of anywhere from 1000 to 10,000,000 centipoise at 25°C and preferably have a viscosity of anywhere from 1000 to 150,000 centipoise at 25°C.

The next ingredient that is mixed with such silanol-stopped diorganopolysiloxanes, preferably from 100 to 350% by weight based on the linear organopolysiloxane is an extending filler. The terminology of an "extending" or "semi-reinforcing" filler rules out the use of fumed silica or precipitated silica whether treated or untreated in the present composition. It is necessary that there be an extending filler rather than a reinforcing filler in the above concentrations in the composition of the instant case in order to give the final composition good chemical resistance without unduly increasing the viscosity of the composition prior to cure. It must be understood that the use of fumed or precipitated silica, that is, the reinforcing fillers, in any significant concentrations in the compositions of the present case would unduly increase the viscosity of the composition prior to cure. Thus, the composition would not have the proper flowability prior to cure so that it would not take up the intricate details, for instance, in the forming of molds from a master that is to be utilized in the preparation of molds of polyvinyl chloride products.

Examples of extending fillers that may be utilized in the present composition mixed in with the silanol-stopped diorganopolysiloxanes are, for instance, titanium dioxide, lithopone, zinc oxide, zirconium silicate, crushed or ground quartz, silica aerogel, iron oxide, diatomaceous earth, calcium carbonate, glass fibers, magnesium oxide, zirconium oxide, aluminum oxide, calcined clay, asbestos, carbon, graphite, cotton fibers and synthetic fibers, and mixtures thereof. Although ground quartz is preferred as the filler in the present composition mixed in with the silanol-stopped linear diorganopolysiloxane, any of the other extending fillers mentioned above may be utilized at a concentration of anywhere from 100 to 350% by weight based on the silanol-stopped linear diorganopolysiloxane. In addition, any type of known extending fillers that are commonly used in room temperature vulcanizable silicone rubber compositions can be utilized in the present invention without deleterious effects. The above list of extending fillers are the preferred fillers and it is not intended that the list be all inclusive.

In addition, the first silicone mixture that is utilized to form the room temperature vulcanizable silicone rubber composition of the present case contains in addition to the silanol-stopped linear diorganopolysiloxane, the extending filler in the concentration mentioned above. There also must be utilized at a concentration of 0.5 to 6% by weight based on the silanol-stopped linear diorganopolysiloxane of a work-life extending additive of the Formula (2) above. This additive is a work-life extending additive which is added to the composition for the purpose of extending the pour time and the work-life of the composition prior to cure. The $R^3$ radical in Formula (2) is preferably selected from alkyl radicals such as, methylethylpropyl of 1 to 8 carbon atoms and etc.; cycloalkyl radicals of 4 to 8 carbon atoms such as, cyclohexyl, cycloheptyl and etc.; mononuclear aryl radicals of 6 to 8 carbon atoms such as, phenyl, ethylphenyl, and etc.; and alkenyl radicals of 2 to 8 carbon atoms such as, vinyl and allyl. Preferably, the $R^3$ radical in the above formulation of the work-life extending additive is selected from the class consisting of methyl, ethyl, vinyl and phenyl. Such low molecular weight silanol-stopped diorganopolysiloxanes of the formula above are well known in silicone chemistry and are generally prepared by the hydrolysis of diorganodichlorosilanes. The above work-life extending additive is then separated from the hydrolysis mixture.

Another method of making such low molecular weight silanol-stopped diorganopolysiloxanes is the reaction of cyclic trisiloxanes in the presence of acetone and water catalyzed by the presence of acid-activated clay such as, sulfuric acid-activated montomorillonite clay, and then taking the reaction product and cooking it at elevated temperatures such as, temperatures of 100° to 200°C until the reaction product is of uniform viscosity, the viscosity being anywhere from 5 to 900 centipoise at 25°C.

The work-life extending additive is a necessary constituent of the first silicone mixture and as has been said it is desirably present at a concentration of 0.5 to 6% by weight based on the linear silanol-stopped diorganopolysiloxane and more preferably at a concentration of anywhere from 2 to 6% by weight of the silanol-stopped diorganopolysiloxane base fluid present in the first silicone mixture. The purpose of such low molecular weight silanol-stopped diorganopolysiloxane in the first silicone mixture is to extend the pour time of the final uncured composition after the catalyst and cross-linking agent has been added to it anywhere from 40 minutes to 6 or 7 hours and so as to permit a work life of the uncured room temperature vulcanizable silicone rubber composition of anywhere from 60 minutes to 8 hours.

Accordingly, to summarize the first silicone mixture or the first component of the room temperature vulcanizable silicone rubber composition of the present case containing the base fluid, that is, the silanol-stopped diorganopolysiloxane fluid, the extending filler in the concentrations indicated and the work life additive which is the silanolstopped diorganopolysiloxane fluid identified above, these fluids as well as the extending filler are thoroughly mixed into each other by methods well known in the silicone art. Optionally, there may also be incorporated into this first silicone mixture a certain amount of water so as to enhance the deep section curing of the final room temperature vulcanizable silicone rubber composition. Thus, preferably, in this first silicone mixture there is added from 90 to 9000 parts per million of free water based on the silanol-stopped linear diorganopolysiloxane base fluid. Although the composition of the present invention will cure properly without the presence of the free water, nevertheless, the free water in the composition as has been stated previously enhances the deep section cure, which to put it another way enhances the complete cure of the present room temperature vulcanizable silicone rubber composition even when it is used to form molds which may be quite thick such as, an inch or more in thickness.

The second silicone mixture which is utilized with the first silicone mixture or first component of the room temperature vulcanizable silicone rubber composition of the present case is composed of a solubilized tin catalyst and an alkyl silicate cross-linking agent. The alkyl silicate or partial hydrolysis product of an alkyl silicate crosslinking agent is preferably present in a second silicone mixture at a concentration of 1 to 30% by weight and preferably 5 to 30% by weight based on the linear silanolstopped diorganopolysiloxane base fluid. The monomeric organic silicate cross-linking agents of Formula (1) above, are well known products in silicone chemistry and the silicone art. Preferably, there is used as a crosslinking agent a liquid partial hydrolysis product of the monomeric silicate. Such hydrolysis products are obtained by effecting partial hydrolysis in water of the particular monomeric organo silicate in the presence of small amounts of acid to a point where there is a water hydrolysis product which is insoluble and it is still possible to isolate a liquid partial hydrolysis organosilicone compound. Thus, the ethyl silicate having the formula $(C_2H_5O)_4Si$ may be partially hydrolyzed by adding acids or acid forming metal salts such as $FeCl_3$, $CuCl_2$, $AlCl_3$, $SnCl_4$, thereafter effecting a suitable hydrolysis mixture of ingredients in order to obtain the two-phase composition from which the water insoluble partial hydrolysis organo silicate can be readily separated from the aqueous phase and catalyst. The partial hydrolysis ethyl silicate is sold under the tradename Ethyl Silicate-40 by Union Carbide Corporation.

Other suitable cross-linking agents are organohydrogenpolysiloxanes of the formula, $$R_a^{43}HSiO_{3-a/2},$$

in which $R^{43}$ is an alkyl or aryl radical and a is a number less than 2, but is not zero. The organohydrogenpolysiloxane cross-linking agents have the disadvantage that during curing there is evolved hydrogen gas which can result in bubbles being trapped in the silicone rubber composition. Although the cross-linking agents can be used in the compositions, the partial hydrolysis organosilicates of Formula (1) are preferred since the processability of the composition is facilitated and the cured silicone rubber composition has better physical properties. A more detailed description of these other cross-linking agents is to be found in Nitzsche et al, U.S. Pat. No. 3,127,363.

Although any of the above cross-linking agents may be utilized in the second silicone mixture that forms a room temperature vulcanizable silicone rubber composition of the present case, the most preferable one to obtain the desired properties in the final room temperature vulcanizable silicone rubber composition in the above concentrations of preferably 5 to 30% by weight is the partial hydrolysis products of the monomeric silicate. The reason is that if the liquid partial hydrolysis product of the monomeric silicates is utilized at the concentrations specified above, then the final composition upon curing will have a shrinkage of less than 1% linear shrinkage at room temperature and more preferably have a shrinkage of less than 0.5%. Such a low shrinkage of the room temperature vulcanizable silicone rubber composition is preferred in making molds. Thus, in making a mold with the present preferred composition from a master, the final mold will have linear shrinkage of less than 1% when utilized there is the liquid partial hydrolysis product of the monomeric silicates, whose formula and method of preparation is indicated above. In addition, there will be sufficient cross-linking agent in the composition to properly cure and cross-link the room temperature vulcanizable silicone rubber composition such that it has the desired physical properties.

Accordingly, when the present composition is desirous for forming molds from masters which molds will be later utilized to form molded polyvinyl chloride parts, polystyrene parts, polyurethane parts and etc., it is preferred that the partial hydrolysis product of the monomeric silicates be utilized at a concentration of 1% and more preferably 5% to 30% by weight based on the linear silanolstopped diorganopolysiloxane base fluid. The final cured room temperature vulcanizable silicone rubber composition upon curing will have less than 1% and preferably less than 0.5% by volume shrinkage so that the mold that is formed from the cured composition can form the desired molded parts with excellent accuracy.

Mixed in with the liquid partial hydrolysis product of the monomeric silicates in the second silicone mixture there is preferably present at a concentration of anywhere from 0.1 to 5% by weight based on the silanol-stopped linear diorganopolysiloxane base fluid of a catalyst which is a reaction product of an organic tin oxide having Formula (3) above, where $R^4$ and $R^5$ are monovalent hydrocarbon radicals with a hydrocarbon ester selected from the class consisting of esters of monocarboxylic acid, esters of dicarboxylic acids, and esters of inorganic acids containing at least one oxygen atom in the compound attached to a replaceable hydrogen atom and where there is reacted from 6 to 1 moles of the organic tin oxide per mole of the ester and the reaction is carried out at a temperature in the range of anywhere from room temperature to 250°C.

As stated previously, the organo tin oxides which are utilized in the present invention to form the reaction product catalyst preferably have the formula,

R″R‴ SnO where R″ and R‴ are monovalent hydrocarbon groups selected from the class consisting of alkyl radicals such as methyl, ethyl, propyl, butyl, etc.; mononuclear and binuclear aryl radicals such as phenyl, naphthyl and etc.; aralkyl radicals such as phenylmethyl and etc. Even more preferably, the R and R″ radicals are selected from alkyl, lower alkyl radicals and mononuclear aryl radicals such as methyl, ethyl and phenyl of up to 8 carbon atoms.

Among the organo tin oxides which are preferred to form the catalyst of the present case are dimethyl tin oxide, diethyl tin oxide, dipropyl tin oxide, dibutyl tin oxide, diamyl tin oxide, dodecyl tin oxide, dilauryl tin oxide, dipropenyl tin oxide, diphenyl tin oxide, ditolyl tin oxide, methylethyl tin oxide and phenylbutyl tin oxide.

In the claim language in defining the catalyst of the present case, as well as in the specification, the term "oxygen-containing acid having at least one oxygen atom in an acid radical attached to a replaceable acid hydrogen atom" is used to define organic acids commonly referred to as monocarboxylic acids and dicarboxylic acids and inorganic acids containing at least one oxygen atom in the acid radical attached to a replaceable acid hydrogen atom such as phosphorous acid, phosphoric acid, silicic acid, sulfurous acid, sulfuric acid, arsenious acid, arsenic acid, boric acid, perchloric acid, chlorous acid, periodic acid, iodous acid, iodic acid, chromic acid, hypochloric acid, nitrous acid, nitric acid, selenic acid, selenous acid, tellurous acid, telluric acid, titanic acid, bromous acid, and the like.

The organic tin oxide may be reacted with any hydrocarbon ester which may be either a saturated hydrocarbon ester or an unsaturated hydrocarbon ester. Among the esters of an oxygen-containing acid which is reacted with the tin oxide to produce the desired reaction product catalyst are hydrocarbon esters such as ethyl orthosilicate, triethyl arsenate, n-propyl silicate, di-n-propyl sulfate, tributyl phosphate, n-octyl nitrate, di-n-dodecyl sulfate, tri-o-cresyl phosphate, tri-p-cresyl phosphate, amyl borate, methyl acetate, dimethyl maleate, dimethyl phthalate, ethyl benzoate, diethyl maleate, diethyl phthalate, diethyl m-phthalate, diethyl p-phthalate, butyl butyrate, dibutyl sebacate, dioctyl phthalate, butyl glycol phthalate, n-butyl propionate, ethylene butyrate, ethylene laurate, 2-propenyl butanoate, phenol acetate, phenyl laurate, diphenyl phthalate, phenyl salicylate, β-napthyl benzoate, and 2-naphthyl lactate. Even more preferred hydrocarbon esters which may be utilized in the present invention to produce the desired catalysts are as follows: methyl acetate, ethyl acetate, n-propyl acetate, isopropyl acetate, butyl acetate, phenol acetate, m-cresyl acetate, methyl propionate, n-butyl propionate, sec-butyl propionate, ethylene propionate, ethyl butyrate, n-propyl butyrate, ethylene butyrate, 2-propenyl butanoate, pentyl butanoate, dimethyl maleate, diethyl maleate, ethyl benzoate, amyl benzoate, β-naphthyl benzoate, dimethyl phthalate, diethyl phthalate, diethyl m-phthalate, diethyl-p-phthalate, butyl glycol phthalate, diphenyl phthalate, dibutyl sebacate, ethylene stearate, ethylene laurate, phenyl laurate, phenyl salicylate, 2-naphthyl lactate. Even more preferred hydrocarbon esters of monocarboxylic acids and dicarboxylic acids are the following hydrocarbon esters for use as reactants with the tin oxides described above for producing the desired catalyst of the present case: dimethyl maleate, dimethyl phthalate, monoethyl maleate, monoethyl phthalate, diethyl maleate, diethyl phthalate, dipropyl maleate, dipropyl phthalate, dibutyl maleate, dibutyl phthalate, dilauryl maleate, and dilauryl phthalate.

To obtain the reaction product of the present case for use in a two-part RTV system of the present case, the reaction is quite simple which comprises mixing the organo tin oxide and the ester together in an agitator and heating the mixture while it has been continuously agitated during a period of about 1 hour or more. During the initial stage of heating, the mixture tends to solidify and form a stiff viscous mass which as the reaction progresses changes into a liquid state as more of the catalyst reaction product is formed. When the reaction is completed, a substantially clear liquid product is obtained.

The organo tin oxide and hydrocarbon ester are preferably reacted in equal molar quantities although a molar quantity of the ester may be reacted with several moles of the organo tin oxide, for example, one mole of diethyl phthalate or ethyl orthosilicate can be reacted with 1, 2, or 4 moles of organo tin oxide. In addition, one mole of tri-cresyl phosphate can be reacted with as many as 6 moles of the organo tin oxide. The reaction may be carried out at various temperatures anywhere from room temperature up to above 250°C. Preferably, a temperature of from 100° to 225°C is desired because the reaction is completed in the specified time period of 1 hour at this temperature range. In addition, for any particular mixture of an ester of an oxygen-containing acid as defined above and an organo tin oxide as defined above, the satisfactory reaction temperature range is the temperature at which the mixture sets up to form a stiff viscous mass. In addition, it may be desired to increase the temperature at 5° above this temperature in order to have the reaction proceed more rapidly. As can be envisioned, the higher the temperature is within the above preferred range of 100° to 225°C, the faster the reaction will proceed to produce the desired reaction product. For example, when an equal molar mixture of a diethyl phthalate and dibutyl tin oxide is agitated and heated to a temperature of 150°C, the slurry formed to a stiff viscous mass which if maintained at this temperature chemically reacts to form a clear-like yellow reaction product, the reaction being completed after a reaction period of about 1 hour as shown by the fact that the viscous mass turns into a clear light yellow liquid product. The liquid reaction product catalyst of the present case that is obtained in accordance with the above disclosure is very soluble in many organic solvents and particularly volatile organic solvents such as ethers, acetones, the chlorinated solvents, xylene, toluene, benzene and etc. The solubility indicated that the product was not merely a solution of the organo tin oxide in the hydrocarbon ester since organo tin oxide is highly insoluble in such organic solvents such as the ones specified above. One of the outstanding advantages of the reaction product catalyst of the present case as defined above, is its very high solubility in alkyl silicates and hydrolysis products of alkyl silicates which is the cross-linking agent in two-part RTV systems and also its high solubility in silanol diorganopolysiloxane gums or fluids. Accordingly, one of the outstanding advantages of the reaction product catalyst of the present case which is prepared as specified above is that it will easily dissolve and be dispersed in the traditional two-part RTV system, thus, enabling the two-part RTV system to cure uniformly after the two components of the system have been mixed. For further information as to the forming of the novel reaction product catalyst of the present case, one is referred to the disclosure of U.S. Pat. No. 2,597,920, whose disclosure is incorporated into the present specification by reference.

Preferably, the solubilized dibutyl tin oxide is reacted with a phthalate ester. As specified, this catalyst may be used in the second silicone mixture along with the partially hydrolyzed alkyl silicate at a concentration of anywhere from 0.1 to 5% by weight based on the linear silanol-stopped diorganopolysiloxane base fluid. For more effective results, it is preferable that it be utilized at a concentration of anywhere from 1 to 3% by weight based on the silanol-stopped linear diorganopolysiloxane base fluid. It is critical to the present invention that the tin catalyst as defined above be utilized in the cured room temperature vulcanizable silicone rubber composition so as to give the final cured composition good physical properties. The active catalyst of the present invention in the concentrations mentioned above will allow that after the room temperature vulcanizable silicone rubber composition of the present case has been prepared that the composition will cure sufficiently in 4–8 hours to have a 40 to 50 durometer, allowing it to be stripped from the master and utilized in a molding process.

It is necessary also that the upper concentration of the present tin catalyst of the present invention not be utilized at a concentration of higher than 5% by weight based on the silanol-stopped linear diorganopolysiloxane base fluid so that the final composition of the present case may have good thermal stability. Thus, with the above concentration of ingredients the present room temperature vulcanizable silicone rubber composition of the present case will have good thermal stability even at elevated temperatures such as, 300°F and above, which temperatures are common in molding processes involving polyvinyl chloride, polystyrene and other molded plastic materials.

Finally, in the second silicone mixture in which there is optionally included and mixed in with the tin catalyst and the partially hydrolyzed monomeric alkyl silicate at a concentration from 20 to 100% by weight of the silanol-stopped linear diorganopolysiloxane base fluid of a silane dispersing agent of Formula (4) above.

In the formula, t is a whole number that varies from 2 to 700 and $R^6$ which may be all the same or different is a radical selected from the class consisting of alkyl radicals of 1 to 8 carbon atoms, halogenated alkyl radicals of 1 to 8 carbon atoms, mononuclear aryl radicals of 6 to 8 carbon atoms, lower alkyl radicals of 4 to 8 carbon atoms, and alkenyl radicals of 2 to 8 carbon atoms. Most preferably, $R^6$ is the above formula, is selected from the class consisting of methyl, ethyl, vinyl and phenyl. This dispersing agent which is preferably present in the second silicone mixture can be prepared by the hydrolysis of diorganidichlorosilane along with the necessary amount of triorganochlorosilanes where the triorganochlorosilane forms the chain-stopping agent. The organo groups in the above silanes is selected from the same radicals and mixtures of the same radicals as $R^6$ that has been defined in Formula (4) above. This dispersing fluid which is an optional ingredient in the compositions of the present case desirably has a viscosity of anywhere from 5 to 50 centipoise at 25°C. It is desirable that this fluid have this viscosity in order to properly disperse into it the tin catalyst of the present case and the partially hydrolyzed alkyl silicate cross-linking agent. As noted, this linear dispersing agent, an optional ingredient, is present solely for the purpose of dispersing and mixing the tin catalyst with the partially hydrolyzed alkyl silicate into it so as to form a uniform mixture which may be added to the first silicone mixture comprising the base fluid, the extending filler and the low molecular weight silanol-stopped diorganopolysiloxane. Any other convenient dispersing fluid may be utilized for this purpose.

The present polysiloxane of Formula (4) is a triorganosiloxy end-stopped polymer of 5 to 40 centipoise viscosity at 25°C and is utilized because it is easily obtainable. In addition, such a fluid functions very efficiently in dispersing the tin catalyst and uniformly mixing the tin catalyst with a partial hydrolysis product of an alkyl silicate. Such a fluid also forms a convenient carrier for mixing the ingredients of the second silicone mixture into the first silicone mixture of the two component room temperature vulcanizable silicone rubber composition of the present case.

Accordingly, the above defines the basic ingredients and also optional ingredients in the room temperature vulcanizable silicone rubber composition of the present case. As is also known, various other ingredients may be mixed into the first silicone mixture or the second silicone mixture of the room temperature vulcanizable silicone rubber composition which additives are well known additives in two-part room temperature vulcanizable silicone rubber compositions such as, pigments and etc.

In preparing the final cured composition of the present case, it should be noted that the first silicone mixture and the second silicone mixture are manufactured and sold in separate containers to the mold maker. When the mold maker desires to form the cured mold, he normally mixes one-part of the second silicone mixture containing the tin catalyst, the carrier and the partial hydrolysis silicate with about 8 to 15 parts of the first silicone mixture comprised of the base silanol-stopped diorganopolysiloxane fluid, the extending filler, and the low molecular weight silanol-stopped diorganopolysiloxane. There is added to the first silicone mixture water as was discussed above. The resulting composition then cures at room temperature to form the silicone elastomer mold that may be utilized with advantage to produce molded products from polyvinyl chloride, polystyrene, various polyesters as well as polyurethane at elevated temperatures.

The usage of the low molecular weight silanolstopped diorganopolysiloxane in the first silicone mixture permits the present composition of the present case, as has been stated previously, to have a pour time of anywhere from 40 minutes to 6 or 7 hours depending on the concentration that is used and a work life of 60 minutes to 8 hours, depending again on the amount of the low molecular weight silanol-stopped diorganopolysiloxane that is utilized in the first silicone mixture and depending on the amount of the tin catalyst that is utilized in the second silicone mixture.

The tin catalyst at the concentrations shown for use in the present invention permits the advantageous room temperature vulcanizable silicone rubber composition of the present case to cure at a fast rate while still having a long work life and long pour time because of the presence of the low molecular weight silanol-stopped diorganopolysiloxane of Formula (4) above. At the same time, the final cured composition has thermal stability at temperatures as high as 400°F. The use of the partially hydrolyzed alkyl silicate cross-linking agent in the second silicone mixture allows the cured room temperature vulcanizable silicone rubber composition to have a low shrinkage upon curing from the uncured composition at a shrinkage of less than 1% linear shrinkage and preferably less than 0.5% shrinkage.

Accordingly, these properties result in a room temperature vulcanizable silicone rubber composition which is eminently suitable for forming molds from masters in which the molds may be utilized to form various plastic molded parts.

The examples given below are for the purpose of illustrating the invention further and are not intended in any way to set or define the limits of the room temperature vulcanizable silicone rubber composition of the present case. All parts are by weight.

EXAMPLE 1

There was formed a first silicone mixture comprising a silanol-stopped diorganopolysiloxane of one viscosity mixed with a silanol-stopped dimethylpolysiloxane of another viscosity such that the blend of the two silanol-stopped dimethylpolysoloxanes had a viscosity of 3,500. There was utilized in the first silicone mixture 35.47 parts of such a blend. To this blend of silanol-stopped dimethylpolysiloxanes there was added 63.54 parts of ground quartz, which was of the size 10 microns and sold under the tradename Minusil. There was also incorporated into the base blend of silanol-stopped dimethylpolysiloxanes 0.90 parts of a low molecular weight silanol-stopped dimethylpolysiloxane containing 6.4% of silanol and having a viscosity of 50 centipoise at 25°C, and also 0.09 parts of free water. There was then formed a second silicone mixture comprised of 20 parts of partially condensed ethyl orthosilicate, 4 parts of the reaction product of dibutyl tin oxide and phthalate ester, and 76.0 parts of a trimethylsiloxy end-stopped dimethylpolysiloxane polymer oil of 20 centipoise viscosity at 25°C. The tin catalyst and partially condensed tetraethyl orthosilicate were uniformly mixed into the trimethylsiloxy end-stopped polymer. To form a mold, 1 part of the second silicone mixture was mixed with 10 parts of the first silicone mixture and a mold was made therefrom. The uncured room temperature vulcanizable silicone rubber composition of above which was used to form a mold had a pour time of 56 minutes, a work life of 91 minutes, Durometer of 40 at the end of 4 hours, so that it could be stripped from the mold. The cured silicone elastomer mold had a percent shrinkage of less than 1% after complete cure of the elastomer mold after 24 hours. In terms of heat stability, the final elastomer mold after it had been cured for 24 hours was placed for 4 hours in an oven maintained at 350°F. It was found that after that time the silicone elastomer mold had a Durometer of 55, which was exactly the same as the initial Durometer subsequent to a 24-hour cure of the two-part room temperature vulcanizable silicone rubber composition.

The final physical properties of the silicone elastomer was as follows:

| | |
|---|---|
| Tensile Strength | 700 psi |
| Elongation (%) | 110 |
| Hardness Shore A (pi) | 62 |
| Tear Die B | 26 |

I claim:

1. A room temperature vulcanizable silicone rubber composition with thermal stability, low shrinkage upon cure and a long work-life comprising:
   a. a linear fluid organopolysiloxane containing terminal silicon-bonded hydroxy groups and having a viscosity of 1000 to 10,000,000 centipoise at 25°C, the organic groups of the aforementioned organopolysiloxane representing monovalent hydrocarbon radicals;
   b. 100 and 350% by weight of said linear organopolysiloxane of an extending filler;
   c. from 1 to 30% by weight of an alkyl silicate based on said linear organopolysiloxane selected from the class consisting of (1) a monomeric organosilicate corresponding to the general formula, (R'O)₃ SiR'' where R' is a radical selected from the class consisting of monovalent hydrocarbon radicals and halogenated monovalent hydrocarbon radicals and R'' is selected from the class consisting of alkyl, haloalkyl, aryl, haloaryl, alkenyl, cycloalkyl, alkoxy and aryloxy radicals, and (2) a liquid partial hydrolysis product of the aforementioned organosilicate monomeric compound;

d. from 0.5 to 6% by weight based on said linear organopolysiloxane of a work-life extending additive of the formula,

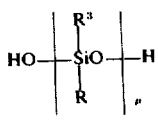

where R³ is a radical selected from the class consisting of monovalent hydrocarbon radicals, halogenated monovalent hydrocarbon radicals and cyanoalkyl radicals, where p varies from 2 to 46; and e. from 0.1 to 5% by weight based on said linear oganopolysiloxane of a catalyst which is the reaction product of an organic tin oxide having the formula, R⁴ R⁵ SnO where R⁴ and R⁵ are monovalent hydrocarbon radicals with a hydrocarbon ester selected from the class consisting of esters of monocarboxylic acid, esters of dicarboxylic acids, and esters of inorganic acids containing at least one oxygen atom in the compound attached to a replaceable hydrogen atom, and where there is reacted from 6 to 1 moles of the organic tin oxide per mole of the ester and the reaction is carried out at a temperature in the range of from room temperature to 250°C.

2. The composition of claim 1 wherein the extending filler is selected from the class consisting of titanium dioxide, lithopone, zinc oxide, zirconium silicate, crushed quartz, silica aerogel, iron oxide, diathomaceous earth, calcium carbonate, glass fibers, magnesium oxide, zirconium oxide, aluminum oxide, calcined clay, asbestos, carbon, graphite, cotton fibers and synthetic fibers.

3. The composition of claim 1 wherein there is present 90 to 9000 parts per million of free water in the composition so as to facilitate deep section cure in the composition.

4. The composition of claim 1 further comprising having in the composition from 20 to 100% by weight of said linear organopolysiloxane of a silicone dispersing agent of the formula,

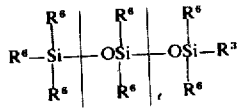

where $t$ is a whole number that varies from 2 to 700, and R⁶ is a radical selected from the class consisting of alkyl radicals, cycloalkyl radicals, alkenyl radicals, halogenated alkyl radicals and mononuclear aryl radicals of up to 8 carbon atoms.

5. The composition of claim 1 wherein there is utilized a concentration of 5 to 30% by weight of said partial hydrolysis product of the monomeric organosilicate compound.

6. The composition of claim 1 wherein linear organopolysiloxane has the formula,

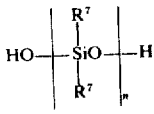

wherein R⁷ is selected from the class consisting of monovalent hydrocarbon radicals, halogenated monovalent hydrocarbon radicals, and cyanoalkyl radicals, and n is a whole number that varies from 300 to 5,260.

7. The composition of claim 1 wherein R⁴ and R⁵ are selected from the class consisting of alkyl radicals and aryl radicals of up to 8 carbon atoms.

8. The composition of claim 1 wherein the liquid partial hydrolysis product of the organosilicate monomeric compound is polyethyl silicate which is present at a concentration of 5 to 30% by weight.

9. The composition of claim 1 wherein R³ is selected from the class consisting of alkyl radicals of 1 to 8 carbon atoms, cycloalkyl radicals, phenyl radicals and vinyl radicals.

10. The composition of claim 1 wherein R⁴ and R⁵ are independently selected from the class consisting of alkyl radicals of 1 to 8 carbon atoms, cycloalkyl radicals of 4 to 6 carbon atoms, phenyl and vinyl radicals.

11. The composition of claim 1 wherein the R⁷ radicals of the linear organopolysiloxane are selected from the class consisting of alkyl radicals of 1 to 8 carbon atoms, cycloalkyl radicals, phenyl radicals and vinyl radicals.

12. A process for preparing a room temperature vulcanizable silicone rubber composition which composition has been cured to an elastomer, has thermal stability, low shrinkage upon cure, and a long work life comprising:

a. mixing a linear organopolysiloxane containing terminal silicon-bonded hydroxy groups and having a viscosity of 1000 to 10,000,000 centipoise at 25°C, the organic groups of the aforementioned organopolysiloxanes representing monovalent hydrocarbon radicals;

b. from 100 to 350% by weight of said linear organopolysiloxane of an extending filler;

c. from 1 to 30% by weight of an alkyl silicate based on said linear organopolysiloxane selected from the class consisting of (1) a monomeric organosilicate corresponding to the general formula, (R'O)₃ SiR'' where R' is a radical selected from the class consisting of monovalent hydrocarbon radicals and halogenated monovalent hydrocarbon radicals and R'' is selected from the class consisting of alkyl, haloalkyl, aryl, haloaryl, alkenyl, cycloalkyl, alkoxy, and aryloxy radicals, and (2) a liquid partial hydrolysis product of the aforementioned organosilicate monomeric compound;

d. from 0.5 to 6% by weight based on said linear organopolysiloxane of a work-life extending additive of the formula,

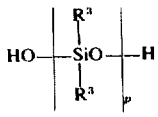

where $R^3$ is a radical selected from the class consisting of monovalent hydrocarbon radicals, halogenated monovalent hydrocarbon radicals and cyanoalkyl radicals, where p varies from 2 to 46; and e. from 0.1 to 5% by weight based on said linear organopolysiloxane of a catalyst which is the reaction product of an organic tin oxide having the formula, $$R^4 R^5 SnO$$

where $R^4$ and $R^5$ are monovalent hydrocarbon radicals, with a hydrocarbon ester selected from the class consisting of esters of monocarboxylic acids, esters of dicarboxylic acids, and esters of inorganic acids containing at least one oxygen atom in the compound attached to replaceable hydrogen atoms, where there is reacted from 6 to 1 moles of the organic tin oxide per mole of the ester and wherein the reaction is carried out at a temperature in the range of from room temperature to 250°C; and allowing the above mixture of ingredients to cure to a silicone elastomer at room temperature.

13. The process of claim 12 wherein in step (a) the extending filler is selected from the class consisting of titanium dioxide, lithopone, zinc oxide, zirconium silicate, crushed quartz, silica aerogel, iron oxide, diatomaceous earh, calcium carbonate, glass fibers, magnesium oxide, zirconium oxide, aluminum oxide, calcined clay, asbestos, carbon, graphite, cotton fibers and synthetic fibers.

14. The process of claim 12 wherein in step (a) there is also mixed into the ingredients of from 90 to 3000 parts per million of free water.

15. The process of claim 12 where there is also mixed into the ingredients in step (a) from 20% to 100% by weight of said linear organopolysiloxane of a silicone dispersing agent of the formula,

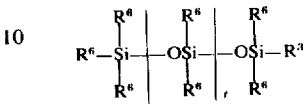

wherein $t$ is a whole number that varies from 2 to 700, and $R^6$ is a radical selected from the class consisting of alkyl radicals, cycloalkyl radicals, alkenyl radicals, halogenated alkyl radicals and mononuclear aryl radicals, of up to 8 carbon atoms.

16. The process of claim 12 wherein there is utilized in step (a) a concentration of 5 to 30% by weight of said partial hydrolysis product of the monomeric organosilicate compound.

17. The process of claim 12 wherein the linear organopolysiloxane has the formula,

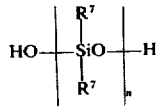

where $R^7$ is selected from the class consisting of monovalent hydrocarbon radicals, halogenated monovalent hydrocarbon radicals, and cyanoalkyl radicals, and n is a whole number that varies from 300 to 5,260.

* * * * *